United States Patent Office 3,171,178
Patented Mar. 2, 1965

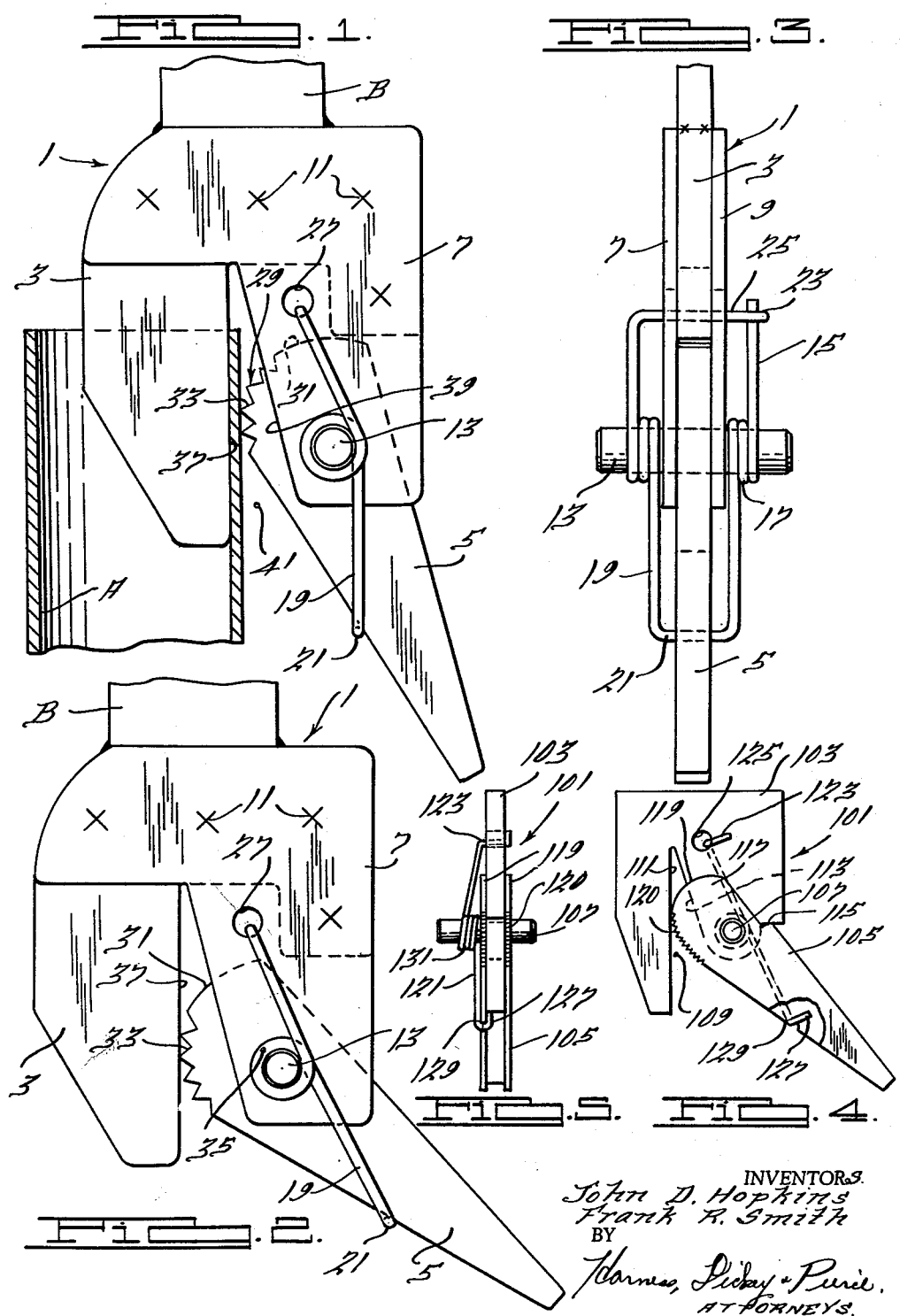

3,171,178
PIPE HOLDER
Frank R. Smith, Racine, and John D. Hopkins, Franksville, Wis., assignors to Walker Manufacturing Company, a corporation of Delaware
Filed May 16, 1963, Ser. No. 280,985
1 Claim. (Cl. 24—253)

This invention relates to pipe handling equipment and, in particular, concerns pipe hangers.

In the manufacture, distribtuion, and storage of automotive tailpipes and exhaust pipes, the handling of the long, irregularly shaped pipes has always been awkward and burdensome. It is the purpose of the invention to facilitate the handling and storage of such pipes, and other kinds of pipes, by means of a fast acting pipe hanger that enables the pipe to be suspended vertically from one end.

The invention is illustrated in the accompanying drawings in which:

FIGURE 1 is a side elevation of a pipe hanger embodying the invention showing a pipe held thereby and showing the hanger attached to an overhead part such as a rack or a conveyor;

FIG. 2 is a side elevation similar to FIG. 1 but shows the pipe hanger in its released position when it is not holding a pipe;

FIG. 3 is a side elevation taken from the right of FIG. 1 but with the pipe omitted;

FIG. 4 is a side elevation of a modified form of the invention; and

FIG. 5 is a side elevation taken from the left of FIG. 4.

The pipe hanger 1 of FIGS. 1–3 comprises a holder plate 3 and a lever 5 of the same thickness as plate 3. A pair of side plates 7 and 9 are attached, as by spotwelds 11, to opposite side faces of the plate 3 to form a holder plate member. The lever is pivotally mounted on side plates 7 and 9 by means of drive pin 13. A spring 15 has its coils 17 mounted on the ends of pin 13. One end 19 bears on the inside of lever 5 at 21 to resiliently resist clockwise rotation of the lever from the position of FIG. 2. The other end of the spring is split at 23 and has a section 25 passing through holes 27 in the side plates to anchor the spring. Counterclockwise movement of the lever is limited by engagement of face 29 with surface 37, as seen in FIG. 2.

The lever 5 has an inner end surface 29 formed as a cam 31 with teeth or serrations 33. The surface 29 may, for example, be formed on a radius from point 35 which is located between the surface 29 and the axis of pivot pin 13 so that the surface 29 recedes from the straight inside pipe suporting face 37 of holder plate 3 as the lever 5 rotates in a clockwise direction. The side plates 7 and 9 have faces 39 that are inclined away from face 37 to define a mouth 41 into which the end of a pipe A may be inserted as shown in FIG. 1.

Due to the pivot mounting of lever 5 and the shape of its end face 29, the end of pipe A may be easily inserted into mouth 41. When this is done, one side of the I.D. of the pipe will be in contact with face 37 and the top edge of the pipe will engage teeth 33 and rotate lever 5 in a clockwise direction. However, outward (downward in the drawings) movement of pie A is prevented since that will rotate lever 5 in a counter-clockwise direction so that the very force tending to remove the pipe will serve to grip and hold it tightly between lever face 29 and holding surface 37. The length of surface 37 will tend to hold the pipe straight against swinging of its axis. To release the pipe A, the lever 5 is engaged by hand or mechanical means and pivoted in a clockwise direction to increase the space between face 29 and surface 37 so that the pipe can slide out of mouth 41.

The holder 1 may be attached to a suitable carrier or support B which, for example, may be carried by an ovrehead conveyor (not shown) or mounted on a storage rack (not shown).

In FIGS. 4 and 5, there is a simplified pipe holder 101 comprising a holder plate member 103 and a lever 105 pivoted on the plate by means of a drive pin 107. The plate 103 has a mouth 109 which includes a straight pipe supporting face 111 (corresponding to face 37) and an inclined face 113. The lever 105 is formed of sheet metal and is U-shaped in cross section but the base of the U terminates in a shoulder 115, leaving two spaced cam sections 117 extending upwardly to fit on opposite sides of plate 103 and be pivoted thereto by pin 107. The ends 119 of cam sections 117 are shaped in the same manner as cam faces 29, including teeth 120, so that the holding and releasing action is the same as that of holder 1.

A spring 121 has one end 123 anchored in a hole 125 in plate 103 and its other end 127 hooked in a slot 129 in the lever 105 on the opposite side of pivot pin 107. Coils 131 in the spring are mounted on the pin 107. The spring will resist clockwise rotation of lever 105. Shoulder 115 may engage the bottom of plate 103 to positively limit counter-clockwise movement.

The plate 103 may obviously be attached by bolting, welding, etc., to any suitable support, such as an overhead conveyor (not shown).

It will now be seen that the invention provides a pipe holder which quickly receives and releases pipes, which holds them in steady position, which readily accepts and reliably holds pipes of various wall thicknesses, and which may be manufactured in large quantities at a minimum expense. By properly spacing the holders 1 or 101 on an overhead support so that faces 37 or 111 are vertical, irregularly shaped pipes, such as automtive exhaust and tailpipes, may be neatly and expeditiously suspended, handled, and stored.

We claim:

A fast acting pipe holder for releasably gripping the wall of an end of a pipe and holding the pipe in a suspended position comprising a holder plate member, said member having a pipe wall receiving mouth having a vertically extending straight side parallel to the axis of the end of the pipe to be held and adapted to engage the inside of the pipe wall and hold the pipe in a non-tilting axial position, said mouth having an inclined side spaced from the extending at an angle to the straight side, an elongated lever having a serrated cam shaped end face disposed in said mouth, a drive pin pivoting said lever on the inclined side section of said plate member, said lever being located so that clockwise rotation of the lever on the pin causes said cam face to recede from said straight side of the mouth, a spring yieldably resisting clockwise rotation of the lever, insertion of the end of a pipe into said mouth causing clockwise rotation of the lever, said spring having coils supported on said drive pin, said holder plate member having a hole therein, one end of the spring being anchored in said hole, the other end of the spring engaging the lever at a point located on the opposite side of the pivot pin from said hole, and means limiting counter-clockwise movement of the lever, said lever being U-shaped in cross section to fit over said holder plate member and the base of the U terminates adjacent the pivot connection of the lever to the holder plate member, in a shoulder engageable with said plate to form said means for limiting counterclockwise movement of the lever, the two sides of said U-shaped lever beyond said shoulder having said cam shaped end face thereon, said holder plate member being adapted for attachment to an overhead support.

References Cited in the file of this patent

UNITED STATES PATENTS

| | | |
|---|---|---|
| D.162,058 | Moody | Feb. 20, 1951 |
| 764,238 | Hamilton | July 5, 1904 |
| 847,106 | Pasqualin | Mar. 12, 1907 |
| 1,279,274 | Combrie | Sept. 17, 1918 |
| 1,727,200 | Gillet | Sept. 3, 1929 |
| 2,036,761 | Krause | Apr. 7, 1936 |
| 2,556,615 | De Vaughn | June 12, 1951 |
| 3,003,806 | Shramek | Oct. 10, 1961 |

FOREIGN PATENTS

| | | |
|---|---|---|
| 936,640 | France | Feb. 23, 1958 |
| 359,187 | Great Britain | Oct. 22, 1931 |

OTHER REFERENCES

Gruter et al., 1,031,626, June 4, 1958 (German printed application).